United States Patent [19]

Daniels et al.

[11] 4,247,179
[45] Jan. 27, 1981

[54] MULTIFOCAL SPECTACLE LENS

[75] Inventors: Erwin J. Daniels, Aalen; Siegfried Korn, Oberkochen, both of Fed. Rep. of Germany

[73] Assignee: Carl Zeiss-Stiftung, Oberkochen, Fed. Rep. of Germany

[21] Appl. No.: 3,982

[22] Filed: Jan. 16, 1979

[30] Foreign Application Priority Data

Jan. 25, 1978 [DE] Fed. Rep. of Germany ....... 2803047

[51] Int. Cl.³ ................................................. G02C 7/06
[52] U.S. Cl. .................................................... 351/171
[58] Field of Search ......................... 351/168, 171, 172

[56] References Cited

FOREIGN PATENT DOCUMENTS 1294335 4/1962 France ..................................... 351/171
1424818 12/1965 France ..................................... 351/171

Primary Examiner—John K. Corbin
Assistant Examiner—Scott J. Sugarman
Attorney, Agent, or Firm—Stonebraker, Shepard & Stephens

[57] ABSTRACT

A multifocal spectacle lens having a single base lens member and at least two additional parts adjacent to each other, attached to the base lens member by fusing or cementing. These additional parts are so shaped that imaginary tangential planes lying in the center of separation lines between the additional parts and tangential to the curved surfaces which effect changes in power extend in pairs of planes which are parallel to each other, in a manner to avoid any jump in the image when the line of sight moves from one of the additional parts to the adjacent additional part.

7 Claims, 13 Drawing Figures

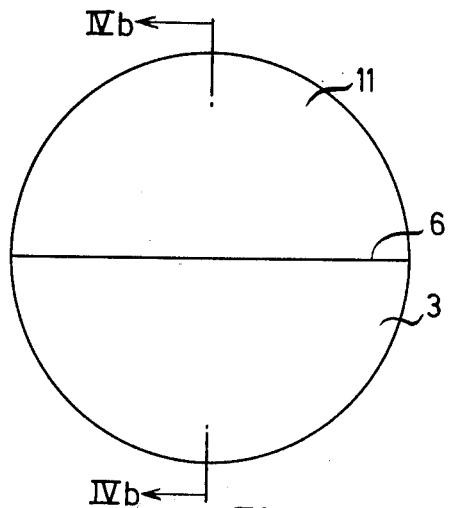
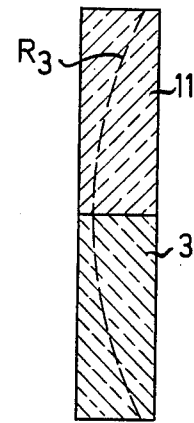
Fig. 4a  Fig. 4b
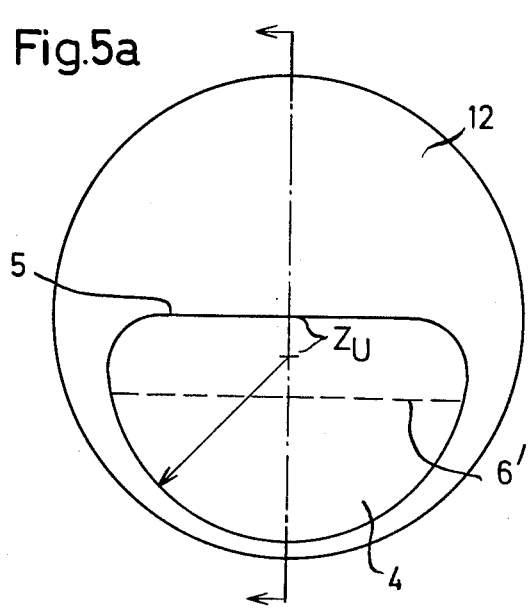
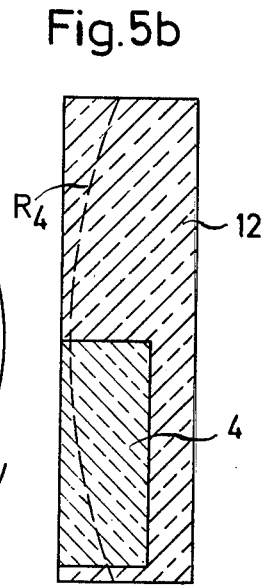
Fig. 5a  Fig. 5b

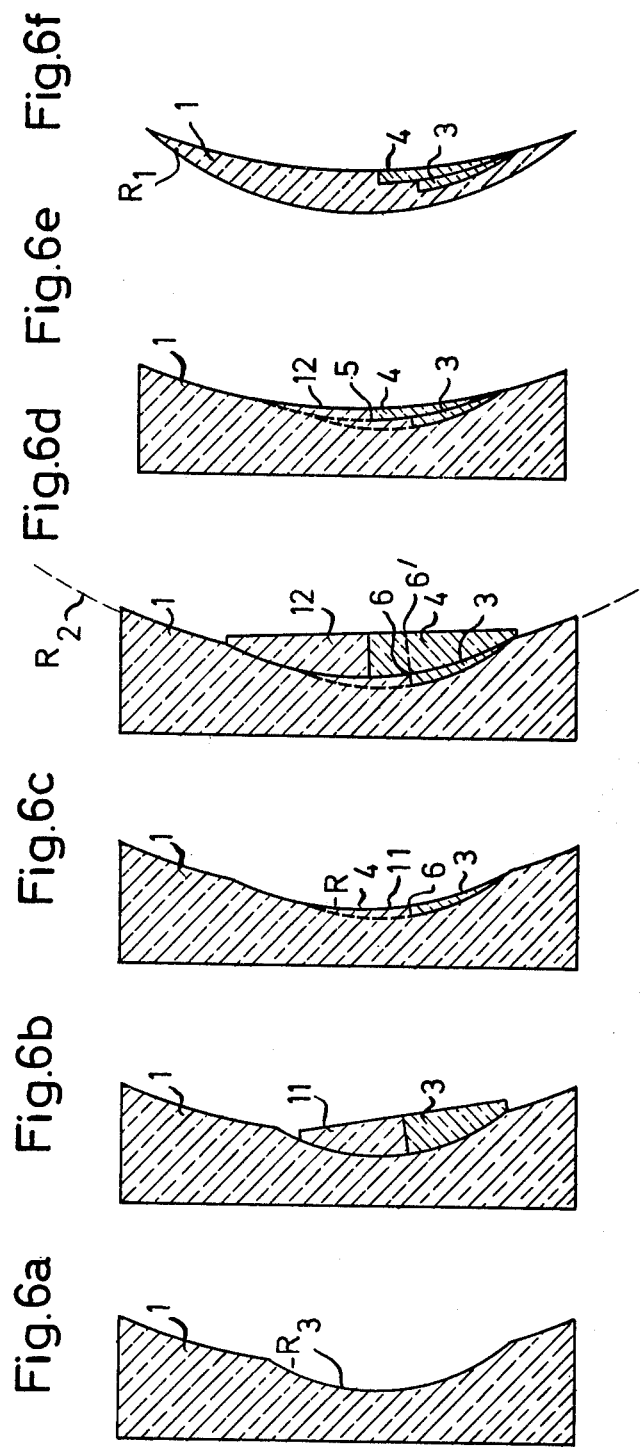

MULTIFOCAL SPECTACLE LENS

BACKGROUND OF THE INVENTION

The present invention relates to a multifocal spectacle lens having a single-part base lens member and at least two adjacent additional parts which are limited to a region of smaller diameter than the single-part base lens.

If such a spectacle lens consists of glass, it is generally produced by fusing the additional lenses into one of the surfaces of the base lens. For this purpose, there is customarily first produced a button-shaped part which consists of three adjoining strips which are fused together. The upper strip consists of glass having the same index of refraction as the base glass, the middle strip consists of glass of higher index of refraction, and the lower strip consists of glass of still higher index of refraction.

After the working of the fusion surface having the radius $R_3$ this button is then fused by known methods into the base glass. Thereupon, the base surface of the spectacle lens is cut and polished. It has the radius $R_1$ or $R_2$ depending on whether the fusion lies in the outer or inner surface of the base glass. In this way, there is produced, as intersection line of the surface having a radius $R_1$ or $R_2$ respectively with the fusion surface of radius $R_3$, a circular limitation of the lower addition part, the center of which lies on or in close proximity to the lower separation line between upper and lower addition parts. At this place the tangential planes to the surfaces having the radius $R_3$ and $R_1$ or $R_2$ respectively are parallel, so that no image jump occurs upon passage (in a vertical direction) of the viewing rays from one addition part to the other.

On the other hand, in this conventional known construction an image jump does occur at the upper separation line between base glass and upper addition part, since the tangential planes to the surfaces having the radius $R_3$ and $R_1$ or $R_2$ respectively form an angle with each other also in the center of the separation line. This image jump is a functional defect. Since the separation line between upper and lower addition parts passes through the center of the circle of intersection, the corresponding separation surface passes through the thickest point of the fused-in lens and is therefore particularly wide and particularly disturbing.

A trifocal lens which is free of image jump is also known in British Pat. No. 951,524, in which lens a semicircular addition lens is fused into a first base part and this base part is fused or cemented over its entire outer surface to a second base part the inner surface of which contains an addition lens which is also semicircular. The addition lens in the second base part is smaller than the one in the first base part. Aside from the fact that this solution cannot be esthetically satisfying, the following functional defects result:

1. The lens surface is cut up by a large number of boundary lines which impede vision.

2. Since the smaller lens must have a minimum height of 12 mm and the intermediate part of a height of 7 mm, a radius of at least 19 mm results for the larger additional lens. Since the larger additional lens thus has a diameter of at least 38 mm it is necessarily thicker and therefore has a very wide separation surface.

3. In addition to the thick larger additional lens there is not only the smaller thickness of the smaller additional lens but also two tolerance spacings between the fused-in surfaces and the outer surfaces of the corresponding base part, so that the spectacle lens becomes thick and heavy.

SUMMARY OF THE INVENTION

The object of the present invention is to provide a multifocal spectacle lens which is completely free of image jump, which does not have any disturbingly thick separation surfaces, and which is not substantially thicker, if at all, than a single-power lens corresponding to the base part.

This object is achieved in a multifocal spectacle lens of the type described above in the manner that the two additional parts consist of the same material and that the imaginary tangential planes which are present in the center of the separation lines between the addition parts and are tangential to the surfaces effecting the changes in power extend in each case parallel to each other in pairs.

The parallel course of the tangential surfaces is obtained in the manner that the center of curvature of the surface of the first addition part introduced into the base lens, namely the so-called intermediate-vision part, lies on the line connecting the center of the separation line with the center of curvature of the corresponding surface of the base lens, and also that the center of curvature of the surface of the second addition part which is introduced into the base lens, namely of the so-called near-vision part, lies on the line connecting the center of the separation line with the center of curvature of the intermediate-vision part.

Intermediate-vision part and near-vision part adjoin each other along lines of the same length. Due to the fact that both parts consist of the same material, the separation surface is approximately as deep as the separation surface between base lens and intermediate-vision part, i.e. it is not disturbingly evident.

The two addition parts are fused or cemented with sharp edge into the base lens, i.e. upon the final working of the surface of the base lens which bears said parts sharp boundary lines are obtained. For the near-vision part, this boundary line has the shape of a circular arc whose center lies in the intermediate-vision part, while for the intermediate-vision part there is obtained an edge line having the shape of a circular arc which starts at the ends of the separation line between intermediate-vision and near-vision parts and whose center lies on the center of the separation line between base lens and intermediate-vision part. This boundary line is not entirely esthetically pleasing so that the corners of the upper separation line of the intermediate vision part are advantageously rounded and the additional parts are thus given a so-called "panto" shape.

In the new multifocal spectacle lens of the present invention, the base part always consists of a single part. It can be made of glass, the addition parts being made of the same glass but of a higher refractive power. In this way the base lens is developed as a far-vision part while the additional parts form intermediate-vision and near-vision parts. For special purposes the additional parts may also consist of glass of lower index of refraction than the base lens, so that the lower additional part acts as a far-vision part, the upper additional part as an intermediate-vision part, and the base lens as a near-vision part.

The additional parts can be fused or cemented in place both on the inner side and on the outer side of the base lens.

It is also possible to produce the new spectacle lens from a single material. The additional parts then protrude somewhat out of the base lens, in which connection both the inner surface and the outer surface can be selected for the application of the additional parts. Such lenses are preferably made of plastic, a mold being employed. This mold is developed in the same manner as the multifocal spectacle lens of glass described above, the additional parts being made of a special glass which can be chemically dissolved after the shape of the glass has been completed.

BRIEF DESCRIPTION OF THE DRAWINGS

The invention will be described in further detail with reference to the accompanying drawings, in which:

FIG. 4a is a face view of the near vision portion of the second additional part prepared for the fusing or cementing in position;

FIG. 4b is a section taken on the line IVb—IVb of FIG. 4a;

FIG. 5a is a face view of the intermediate vision portion of the second additional part prepared for the fusing or cementing in position;

FIG. 5b is a central vertical section through FIG. 5a; and

FIGS. 6a–f show different phases in the manufacture of the trifocal lens of FIG. 1.

DESCRIPTION OF THE PREFERRED EMBODIMENT

Figure 1:
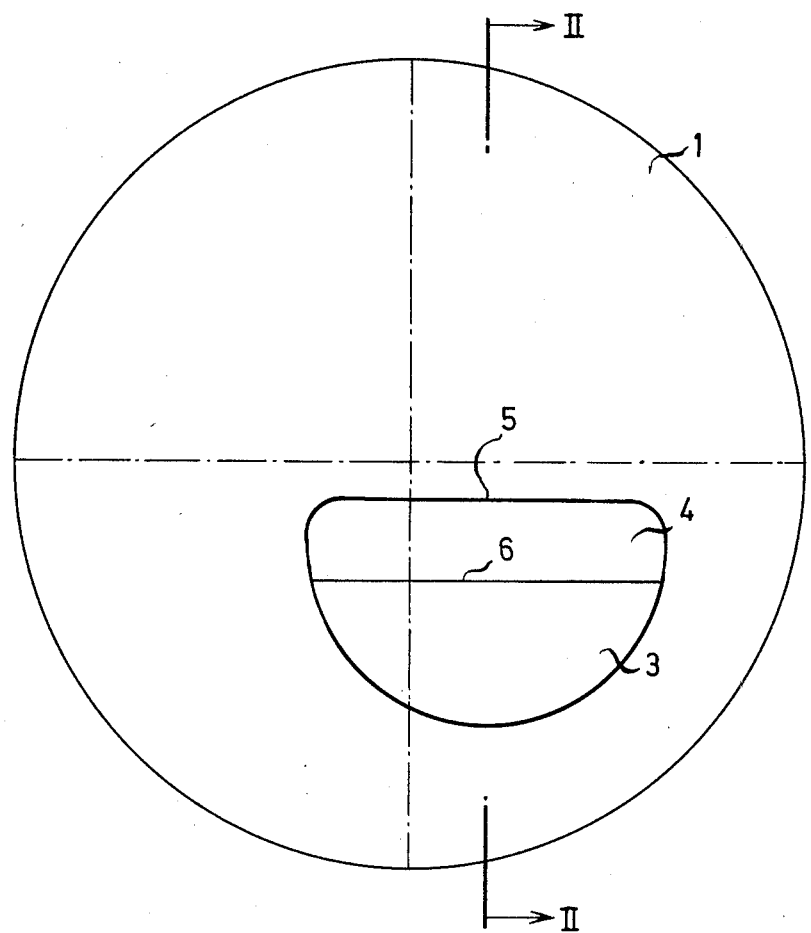
FIG. 1 shows a face view of a preferred embodiment of a trifocal lens developed in accordance with the invention.
Figure 2:
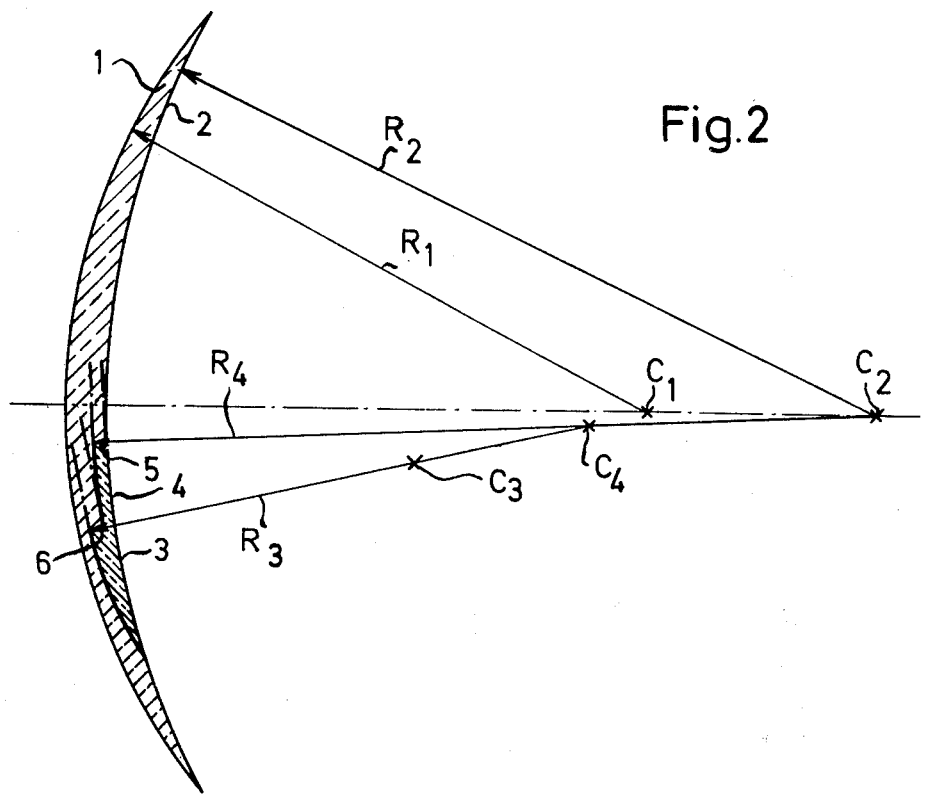
FIG. 2 is a section along the line II—II of FIG. 1.

FIGS. 1 and 2 show a trifocal lens which consists of a base lens 1 within the inner surface 2 of which the two additional parts 3 and 4 are fused or cemented. These two additional parts consist of the same material.

In the sectional view of FIG. 2, the radius of the inner surface 2 is designated $R_2$, while $R_1$ designates the radius of the outer surface. The intermediate-vision part 4 is limited by the radius $R_2$ and by the radius $R_4$ which lies within the base glass 1. The outer surface within the base glass 1 of the near-vision part 3 has the radius $R_3$. As can be noted from FIG. 2, the center $C_4$ of the radius $R_4$ lies on the line connecting the center of the separation line 5 with the center $C_2$ of the surface 2. The center $C_3$ for the radius $R_3$ of the near-vision part 3 lies on the line which connects the center of the separation line 6 with the point $C_4$. If the planes (shown in dot-dash line) tangential to the surface 2 and the $R_4$ surface of the intermediate part 4 are drawn in the center of the separation line 5 these two tangential planes extend precisely parallel to each other. The same applies with respect to the two planes which are tangential at the center of the separation line 6 to the $R_4$ and $R_3$ surfaces of the intermediate-vision part 4 and the near-vision part 3. Accordingly no wedge angle is present at the separation line 5 or at the separation line 6, i.e. the trifocal glass shown is free of image jump.

Figure 3:
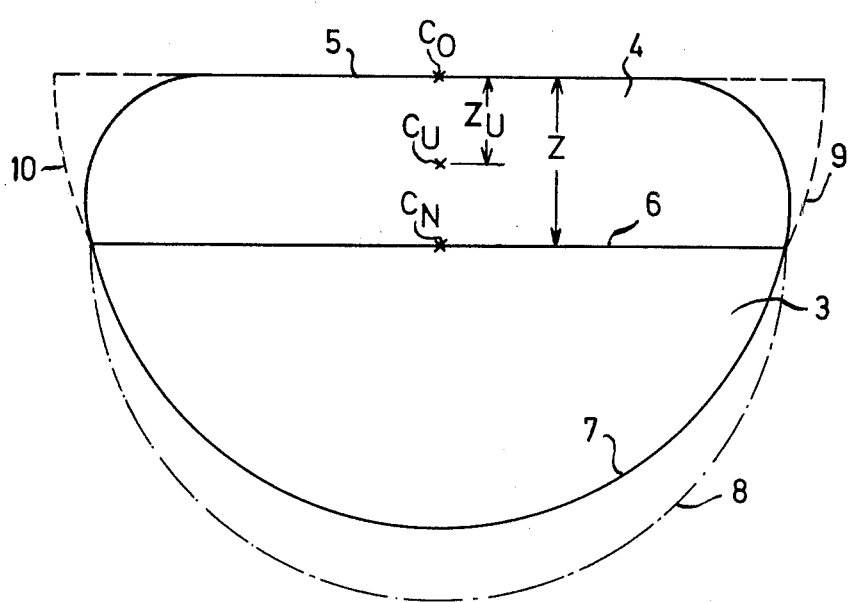
FIG. 3 is a face view of the two additional parts on a larger scale.

FIG. 3 shows an enlarged view of the two intermediate-vision parts 3,4 in finished condition of the lens 1. It can be seen that the near-vision part 3 is limited by the boundary line 7, which has the shape of a circular arc with the center $C_U$ which lies within the intermediate-vision part 4. After the near-vision part 3 has been fused or cemented into position and the second fusion radius $R_4$ worked as explained with reference to FIG. 6c, the near-vision part 3 is initially limited by the contour line 8 which represents a circular arc having its center at the point $C_N$. Upon the final machining of the inner surface 2 there is then produced the contour line 7 which is the intersection line of the $R_2$ and $R_3$ surfaces.

The intermediate-vision part 4, if one were to start from an identical round blank, would be limited, as in the case of the near-vision part 3 (see FIGS. 4a and 4b), by the two circular-arc sections 9 and 10 (FIG. 3) whose center is at the point $C_O$ on the separation line 5. For the distance $Z_U$ between the separation line 5 and the point $C_U$ there applies, with good approximation, the formula $$Z_U = (1 - (\text{Add }(4))/(\text{Add}) \cdot Z$$

in which Z is the height of the intermediate-vision part 4 and Add (4) the addition in the intermediate vision part and Add the addition in the near-vision part.

For esthetic reasons, the corners of the upper separation line 5 are rounded so that the "panto" shape, shown by solid-line contour in FIG. 3 is formed.

In order to produce the trifocal lens shown in FIG. 1, the two parts 3 and 11 are first of all, as shown in FIGS. 4a and 4b, fused together along the line 6. The outer surface having the radius $R_3$ is then formed.

For the preparation of the intermediate-vision part, the part 4 which consists of the same material as part 3 is first of all, as shown in FIGS. 5a and 5b, fused to the glass part 12. Then the surface with radius $R_4$ is formed.

The two glass parts 11 and 12 consist of the same glass as the base lens 1.

Thereupon the part in accordance with FIG. 4 is fused or cemented into the base glass 1 which is provided for this purpose with the radius $-R_3$ (FIGS. 6a and 6b). Thereupon the radius $-R_4$ is so worked (FIG. 6c) that the separation line 6 is just as long as the line 6' in FIG. 5a and the remaining part 11, 3 is precisely halved. The part 3 is now limited by the lower marginal arc 8 (FIG. 3) whose center $C_N$ lies on the center of the separation line 6.

The part according to FIG. 5 is now fused or cemented into the base glass 1 connected with the additional lens 3 (FIG. 6d). In this connection it must be seen to it that the separation line 6 and the line 6' lie precisely on each other.

As final step the radius $R_2$ is then worked (FIG. 6e) in such a manner that the separation line 5 precisely divides vertically in half the resulting lens consisting of the still remaining glass parts 4 and 12 and that the circle of intersection 7 of $R_2$ and $R_3$ (FIG. 3) extends precisely into the rounded portions of part 4.

The prescription surface $R_1$ can now, if necessary, be applied to the semi-finished product thus obtained (FIG. 6f). Since the "supplementary parts" 11 and 12 consist of the glass of the base lens 1, they cannot be perceived in the latter.

It is readily clear that the method of manufacture shown in FIGS. 4, 5 and 6 has been indicated merely as an example and that other methods of manufacture can be employed.

If the fusing is effected with glass parts 3 and 4 of chemically soluble material these parts can finally be removed from the semi-finished product of FIG. 6 and the latter can be used as mold for a plastic lens. In the plastic lens the addition parts would then consist of the same material as the base lens. It is precisely as free of image jumps on both separation lines as the fused trifocal lens of silicate glass described above.

The trifocal lens of FIG. 1 has parallel straight separation lines 5 and 6. For esthetic reasons the separation lines 5 and 6 may also be slightly curved.

What is claimed is:

1. A multifocal spectacle lens comprising a single-part base lens and at least two adjacent additional parts restricted to an area of smaller diameter than that of said single-part base lens, characterized by the fact that said additional parts (3, 4) are made of the same material, and that said parts are so shaped that imaginary tangential planes lying in the center of separation lines (5, 6) between said additional parts (3, 4) and tangential to curved surfaces ($R_2$, $R_4$, $R_3$) which effect changes in power extend in each case in pairs which are parallel to each other, and that said additional parts (3, 4) adjoin each other along lines of the same length (6).

2. A lens as defined in claim 1, characterized by the fact that after the completing of the working of that surface (2) of said base lens (1) which bears said additional parts (3, 4), the lower additional part (3) is limited by a circular arc (7) the center point ($C_U$) of which lies in the upper additional part (4).

3. A lens as defined in claim 1, characterized by the fact that said base lens (1) and said additional parts (3, 4) consist of the same material.

4. A lens as defined in claim 1, characterized by the fact that the separation lines (5, 6) between said base lens (1) and said first additional part (4) and between said additional parts (3, 4), are curved and extend parallel to each other.

5. A multifocal spectacle lens comprising a base lens member (1) having a curved surface (2) formed with a radius ($R_2$) from a first center point ($C_2$), and two additional lens members (3, 4) adjacent to each other and both set into and fixed in said base lens member, each of said additional members having a first surface which is a smooth continuation of and has the same radius ($R_2$) as said surface (2) of said base member, the first additional lens member (4) having an edge meeting an edge of said base member (1) along a line (5) lying in a first plane extending in a radial direction with respect to said curved surface (2), said first center point ($C_2$) lying in said first plane, said first additional lens member (4) having a second curved surface formed with a radius ($R_4$) from a second center point ($C_4$) lying in said first plane, the second additional lens member (3) joining said first additional lens member (4) along a line (6) lying in a second plane extending in an approximately radial direction with respect to said first mentioned curved surface (2) and intersecting said first plane at said second center point ($C_4$), said second additional lens member (3) having a second curved surface formed with a radius ($R_3$) from a third center point ($C_3$) lying in said second plane, the first additional lens member (4) and the second additional lens member (3) both being made of the same material and adjoining each other along lines of the same length.

6. A multifocal spectacle lens comprising a main lens member formed of material having one index of refraction, a first additional member and a second additional member both formed of material having a different index of refraction from that of said main member and mounted on said main member to provide an intermediate vision portion and a near vision portion, respectively, said main member and additional member having curved surfaces so shaped that at a first point where a line of vision shifts from said main member to said first additional member, the two centers of curvature of those curved surfaces of the main member and the first additional member which respectively affect the apparent location of the image both lie on the same radial line passing through said first point, and at a second point where a line of vision shifts from said first additional member to said second additional member, the two centers of curvature of those curved surfaces of the first additional member and the second additional member which respectively affect the apparent location of an image both lie on the same radial line passing through said second point, the first additional member and the second additional member adjoining each other along lines of the same length.

7. A lens as defined in claim 6, wherein said main member has a curved surface (2) having a radius ($R_2$) struck from a first center ($C_2$), the first additional member has a curved surface having a radius ($R_4$) struck from a second center ($C_4$) on a radial line from the first center ($C_2$) to one edge of the first additional member, and the second additional member has a curved surface having a radius ($R_3$) struck from a third center ($C_3$) on a radial line from the second center to a junction between said first additional member and said second additional member.

* * * * *